(12) United States Patent
Shibahiraki et al.

(10) Patent No.: US 8,092,313 B2
(45) Date of Patent: Jan. 10, 2012

(54) UNIVERSAL JOINT YOKE, UNIVERSAL JOINT, AND VEHICLE STEERING APPARATUS

(75) Inventors: Yutaka Shibahiraki, Kashiwara (JP); Hidekazu Sakakibara, Tondabayashi (JP); Satoshi Kakutani, Kashihara (JP); Makoto Aida, Tenri (JP)

(73) Assignees: JTEKT Corporation, Osaka-shi (JP); Koyo Machine Industries Co., Ltd., Yao-shi (JP)

( * ) Notice: Subject to any disclaimer, the term of this patent is extended or adjusted under 35 U.S.C. 154(b) by 323 days.

(21) Appl. No.: 12/416,528

(22) Filed: Apr. 1, 2009

(65) Prior Publication Data

US 2009/0242315 A1 Oct. 1, 2009

(30) Foreign Application Priority Data

Apr. 1, 2008 (JP) ................................. 2008-095380

(51) Int. Cl.
*F16D 3/38* (2006.01)
(52) U.S. Cl. ........................................................ 464/134
(58) Field of Classification Search .................. 464/134, 464/135, 182; 403/235, 236, 344
See application file for complete search history.

(56) References Cited

U.S. PATENT DOCUMENTS

| 2,278,698 | A | * | 4/1942 | Green | 464/182 |
| 4,915,536 | A | * | 4/1990 | Bear et al. | 464/182 X |
| 4,995,849 | A | * | 2/1991 | Castellon | 464/134 |
| 5,575,581 | A | * | 11/1996 | DeBisschop | 464/134 X |
| 6,692,177 | B2 | * | 2/2004 | Crudele et al. | 464/134 X |

FOREIGN PATENT DOCUMENTS

| JP | 54-118937 | 9/1979 |
| JP | 3-9118 | 1/1991 |
| JP | 4-122224 | 11/1992 |
| JP | 2003-287052 | 10/2003 |
| JP | 2007-333189 | 12/2007 |

* cited by examiner

*Primary Examiner* — Gregory Binda
(74) *Attorney, Agent, or Firm* — Oblon, Spivak, McClelland, Maier & Neustadt, L.L.P.

(57) ABSTRACT

A universal joint yoke includes: a cylindrical portion for fixing a shaft; a slit that is formed in the cylindrical portion and that extends from one end of the cylindrical portion in an axial direction of the cylindrical portion, which is a first direction; a reinforcement flange that extends from the other end of the cylindrical portion radially outward with respect to the cylindrical portion; and a pair of arms that extend from the reinforcement flange on a side opposite to a side on which the cylindrical portion is provided and that are swingably coupled to another yoke via a coupling shaft.

15 Claims, 7 Drawing Sheets

UNIVERSAL JOINT YOKE, UNIVERSAL JOINT, AND VEHICLE STEERING APPARATUS

INCORPORATION BY REFERENCE

The disclosure of Japanese Patent Application No. 2008-095380 filed on Apr. 1, 2008 including the specification, drawings and abstract is incorporated herein by reference in its entirety.

BACKGROUND OF THE INVENTION

1. Field of the Invention

The invention relates to a universal joint yoke, a universal joint, and a vehicle steering apparatus.

2. Description of the Related Art

A universal joint is, for example, used in a vehicle steering apparatus. The universal joint includes a pair of yokes that are swingably coupled to each other via a cross shaft or an X-shaped shaft. Japanese Utility Model Application Publication No. 4-122224 (JP-U-4-122224), Japanese Patent Application Publication No. 2007-333189 (JP-A-2007-333189) and Japanese Patent Application Publication No. 54-118937 (JP-A-54-118937) describe that a yoke has a cylindrical portion for fixing a shaft and a pair of arms that extend parallel to the axial direction of the cylindrical portion. The pair of arms extend from one end of the cylindrical portion. Japanese Patent Application Publication No. 3-9118 (JP-A-3-9118) also describes a yoke that has a cylindrical portion for fixing a shaft, a pair of arms that extend parallel to the axial direction of the cylindrical portion, and a flat plate provided at one end of the cylindrical portion. The flat plate is arranged perpendicularly to the axial direction of the cylindrical portion. The arms project from the flat plate in the axial direction of the cylindrical portion.

Japanese Patent Application Publication No. 2003-287052 (JP-A-2003-287052) describes a yoke that has a pair of arms and a flat plate that connects the pair of arms to each other. The flat plate is arranged perpendicularly to the axial direction of a shaft. The shaft is directly welded to the flat plate.

According to the structures described in JP-U-4-122224, JP-A-2007-333189, JP-A-54-118937 and JP-A-3-9118, to fix the shaft to the cylindrical portion of the yoke, it is necessary to, for example, weld the shaft to the cylindrical portion at expense of time and effort. This also applies to JP-A-2003-287052. On the other hand, to make it easy to fix the shaft, the cylindrical portion of a universal joint yoke may have a slit that extends in the axial direction of the cylindrical portion. For example, first and second tabs are provided respectively on both sides of the slit so as to face each other. A bolt is inserted through a bolt insertion hole of the first tab and screwed into a screw hole of the second tab, thus fastening the shaft with the cylindrical portion. However, the slit decreases the strength of the cylindrical portion and, as a result, the life of the yoke shortens. Conversely, when the yoke is formed to be thick so as to extend the life of the yoke, the size of the yoke increases.

SUMMARY OF THE INVENTION

The invention provides a universal joint yoke, a universal joint and a vehicle steering apparatus with small size and long life.

According to an embodiment of the invention, a universal joint yoke includes: a cylindrical portion for fixing a shaft; a slit that is formed in the cylindrical portion and that extends from one end of the cylindrical portion in an axial direction of the cylindrical portion, which is a first direction; a reinforcement flange that extends from the other end of the cylindrical portion radially outward with respect to the cylindrical portion; and a pair of arms that extend from the reinforcement flange on a side opposite to a side on which the cylindrical portion is provided and that are swingably coupled to another yoke via a coupling shaft.

With the above embodiment, the pair of arms and the cylindrical portion may be reinforced by the reinforcement flange against a torsional force about the central axis of the cylindrical portion. This may extend the life of the yoke.

In addition, the universal joint yoke according to the above embodiment may be used for a universal joint. Furthermore, the universal joint may be used for a vehicle steering apparatus.

BRIEF DESCRIPTION OF THE DRAWINGS

The features, advantages, and technical and industrial significance of this invention will be described in the following detailed description of example embodiments of the invention with reference to the accompanying drawings, in which like numerals denote. like elements, and wherein.

DETAILED DESCRIPTION OF EMBODIMENTS

Figure 1:
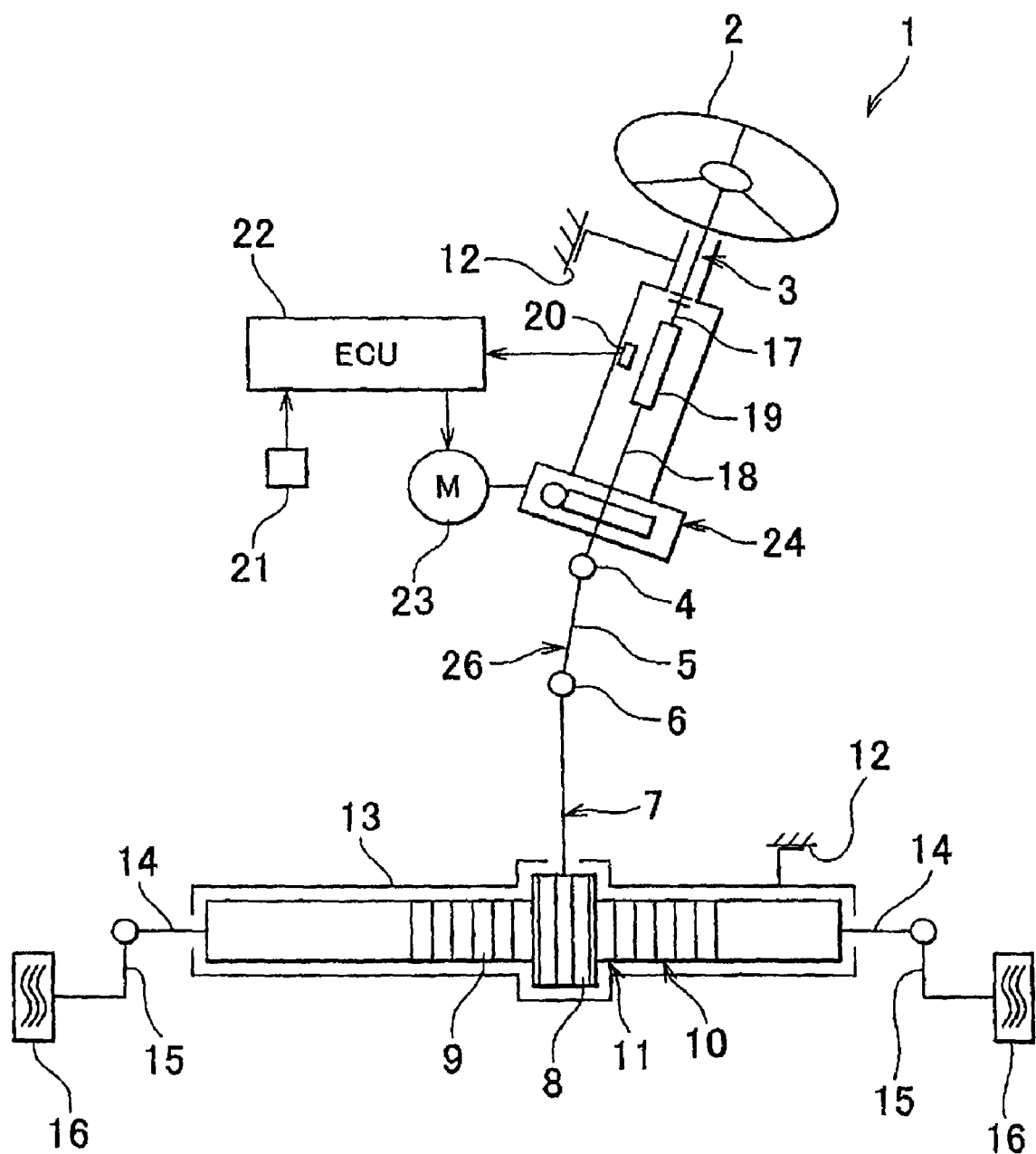
FIG. 1 is a schematic configuration diagram of an electric power steering that includes a universal joint yoke according to an embodiment of the invention.

An embodiment of the invention will be described with reference to the accompanying drawings. The present embodiment describes a case in which a universal joint is applied to an electric power steering, which is a vehicle steering apparatus. Note that a universal joint yoke of the present embodiment may be applied to an apparatus, other than the electric power steering. FIG. 1 is a schematic configuration diagram of the electric power steering that includes the universal joint yoke according to the embodiment of the invention. Referring to FIG. 1, an electric power steering (EPS) 1 includes a steering shaft 3, an intermediate shaft 5, a pinion shaft 7, and a rack bar 10. The steering shaft 3 is coupled to a steering member 2, such as a steering wheel. The intermediate shaft 5 is coupled to the steering shaft 3 via a first universal joint 4. The pinion shaft 7 is coupled to the intermediate shaft 5 via a second universal joint 6. The rack bar 10 has rack teeth 9 that mesh with pinion teeth 8 provided near an end of the pinion shaft 7. The rack bar 10, which serves as a steering rack shaft, extends in the transverse direction of a vehicle.

A steering gear 11 includes a rack and pinion mechanism formed of the pinion shaft 7 and the rack bar 10. The rack bar 10 is supported in a rack housing 13 via a plurality of bearings (not shown) so that the rack bar 10 is linearly and reciprocally movable. The rack housing 13 is fixed to a vehicle body 12. A pair of tie rods 14 are connected to the rack bar 10. Each tie rod 14 is coupled to a steered wheel 16 via a knuckle arm 15.

As the steering member 2 is operated to rotate the steering shaft 3, the rotation of the steering shaft 3 is converted by the pinion teeth 8 and the rack teeth 9 into the linear motion of the rack bar 10 in the transverse direction of the vehicle. By so doing, the steered wheels 16 are steered. The steering shaft 3 is divided into an input shaft 17 and an output shaft 18. The input shaft 17 is operatively coupled to the steering member 2. The output shaft 18 is operatively coupled to the pinion shaft 7. These input shaft 17 and output shaft 18 are coupled to each other in the same axis via a torsion bar spring 19. As a steering torque is input to the input shaft 17, the torsion bar spring 19 elastically torsionally deforms. Thus, relative rotation occurs between the input shaft 17 and the output shaft 18.

A torque sensor 20 is provided to detect a steering torque on the basis of an amount of displacement in relative rotation between the input shaft 17 and the output shaft 18 via the torsion bar spring 19. In addition, a vehicle speed sensor 21 is provided to detect a vehicle speed. In addition, an electronic control unit (ECU) 22, which serves as a controller, is provided. Furthermore, an electric motor 23 is provided to generate a steering assist force, and a speed reducer 24 is provided to reduce the output rotational speed of the electric motor 23.

A detection signal from the torque sensor 20 and a detection signal from the vehicle speed sensor 21 are input to the ECU 22. The ECU 22 controls the electric motor 23 for assisting steering on the basis of the torque detection signal, the vehicle speed detection signal, and the like. The output rotational speed of the electric motor 23 is reduced by the speed reducer 24 and transmitted to the pinion shaft 7, and then converted into the linear motion of the rack bar 10, thus assisting steering.

Figure 2:
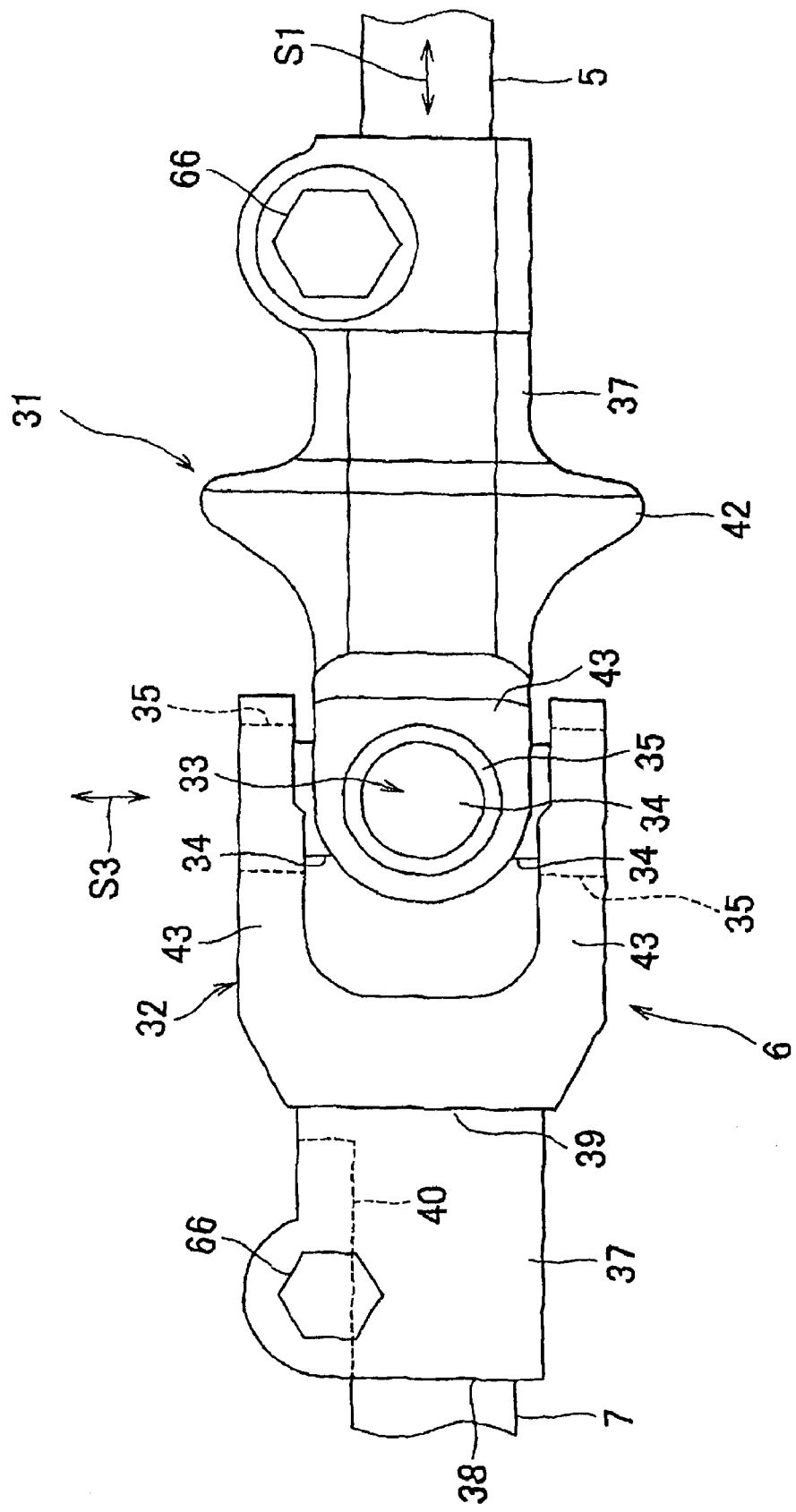
FIG. 2 is a side view of a second universal joint shown in FIG. 1.

The first universal joint 4, the intermediate shaft 5 and the second universal joint 6 are integrated to form a single unit 26. FIG. 2 is a side view of the second universal joint 6 shown in FIG. 1. Referring to FIG. 2, the second universal joint 6 couples the intermediate shaft 5, which serves as a first shaft, to the pinion shaft 7, which serves as a second shaft. The second universal joint 6 has a first yoke 31, a second yoke 32, and a cross shaft (X-shaped shaft) 33. The intermediate shaft 5 is connected to the first yoke 31, which serves as a universal joint yoke. The pinion shaft 7 is connected to the second yoke 32, which serves as another yoke (yoke to which the first yoke 31 is coupled). The cross shaft 33 couples the first yoke 31 to the second yoke 32. The cross shaft 33 has four trunnions 34 as shaft portions.

The first and second yokes 31 and 32 respectively support a pair of the trunnions 34 via bearings 35, such as needle roller bearings. Note that the second yoke 32 may have a similar structure to that of the first yoke 31 of the present embodiment. In addition, the first universal joint 4 may include a yoke that has a similar structure to that of the first yoke 31 of the second universal joint 6. Hereinafter, the first yoke 31 of the second universal joint 6 will be described. The second yoke 32 will be described focusing on the difference from the first yoke 31.

Figure 3:
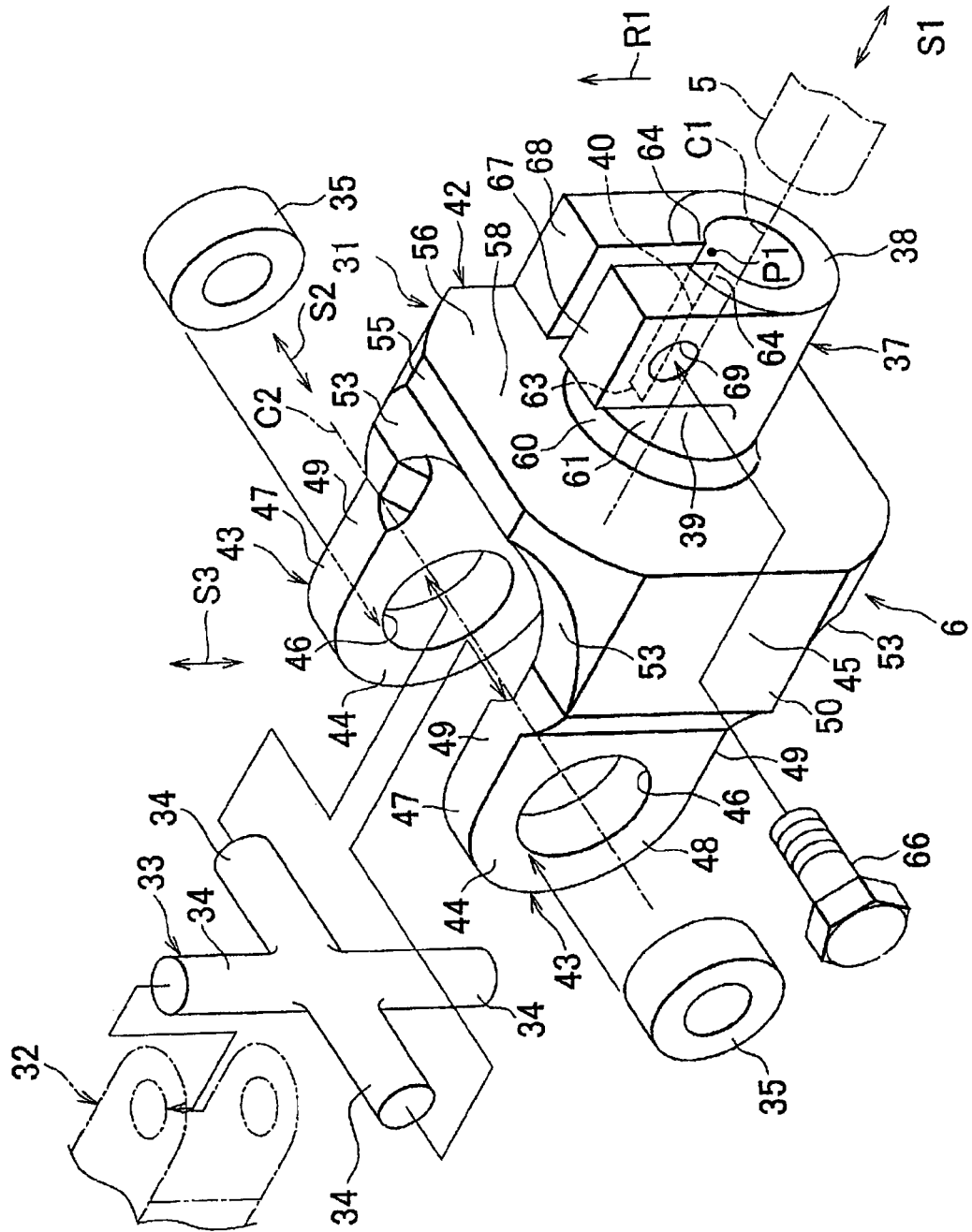
FIG. 3 is a perspective view of a first yoke shown in FIG. 2, in which a second yoke, a cross shaft, bearings, and the like, are also shown, and the second yoke is schematically shown.
Figure 4:
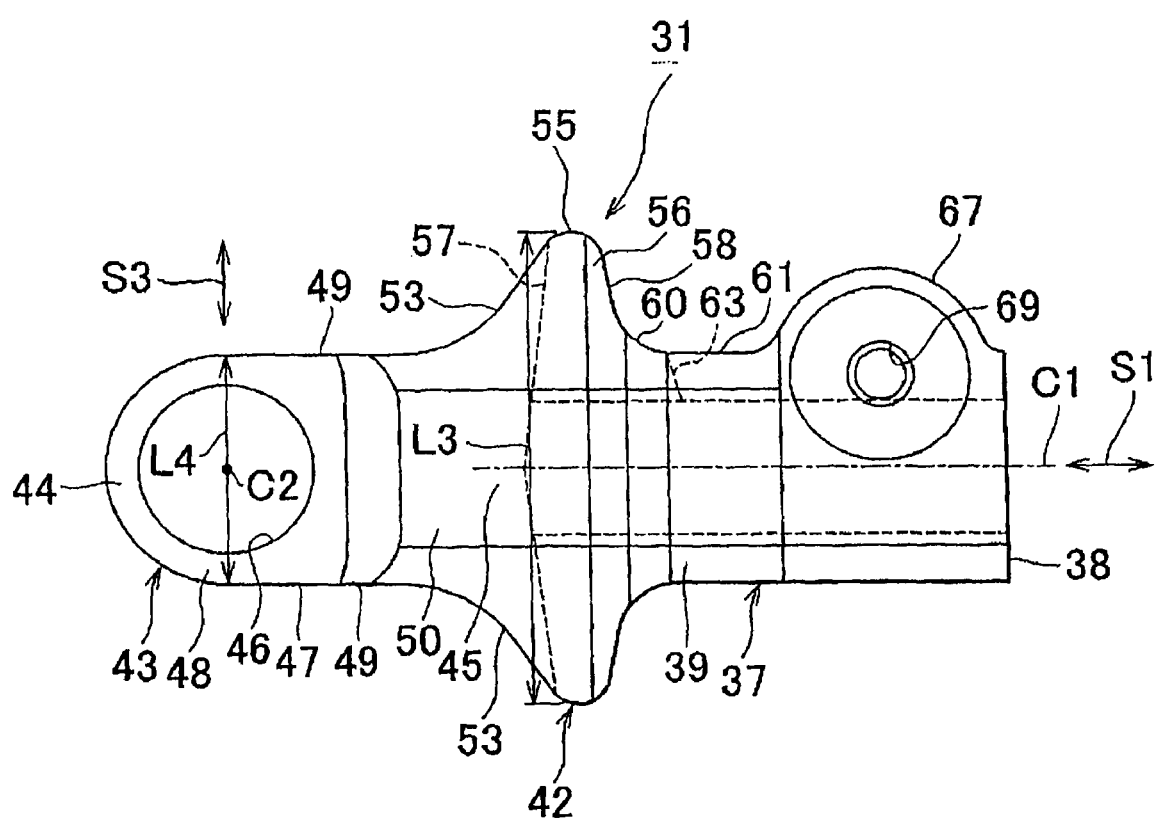
FIG. 4 is a side view of the first yoke shown in FIG. 3.
Figure 5:
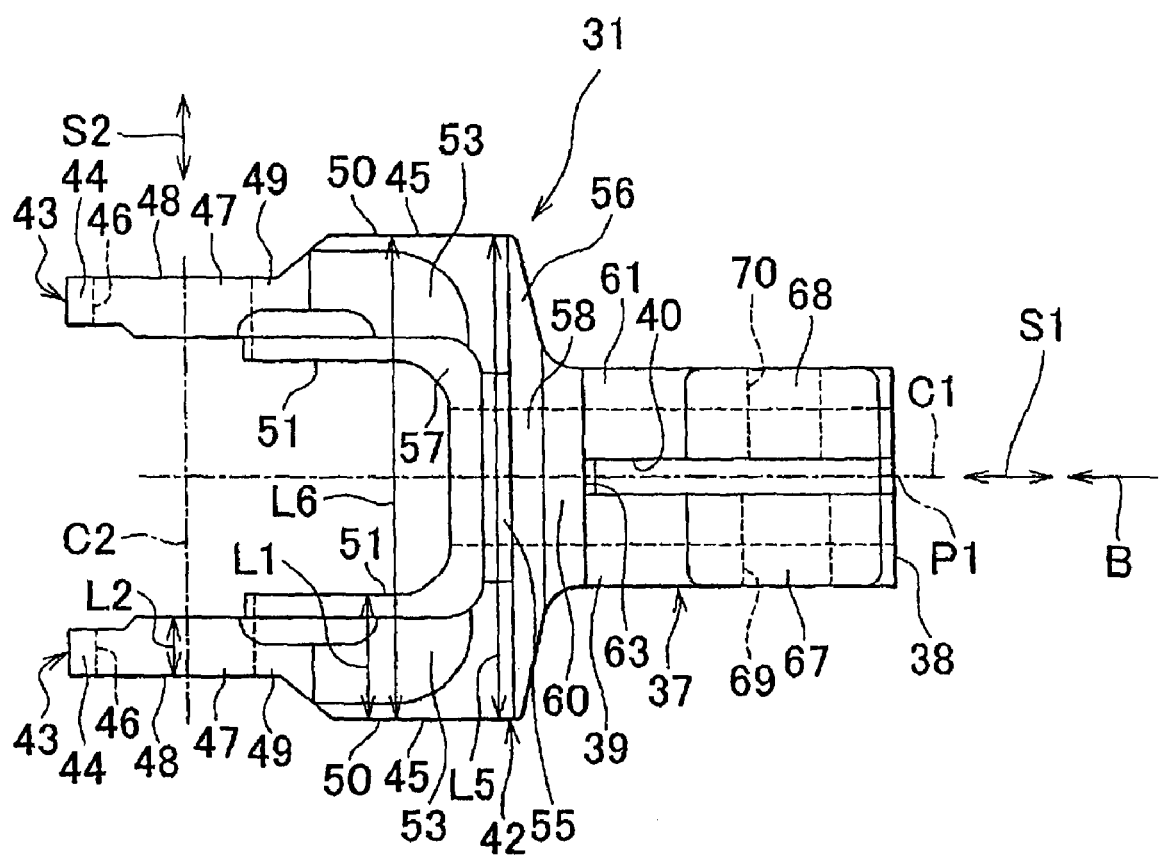
FIG. 5 is a plan view of FIG. 4.
Figure 6:
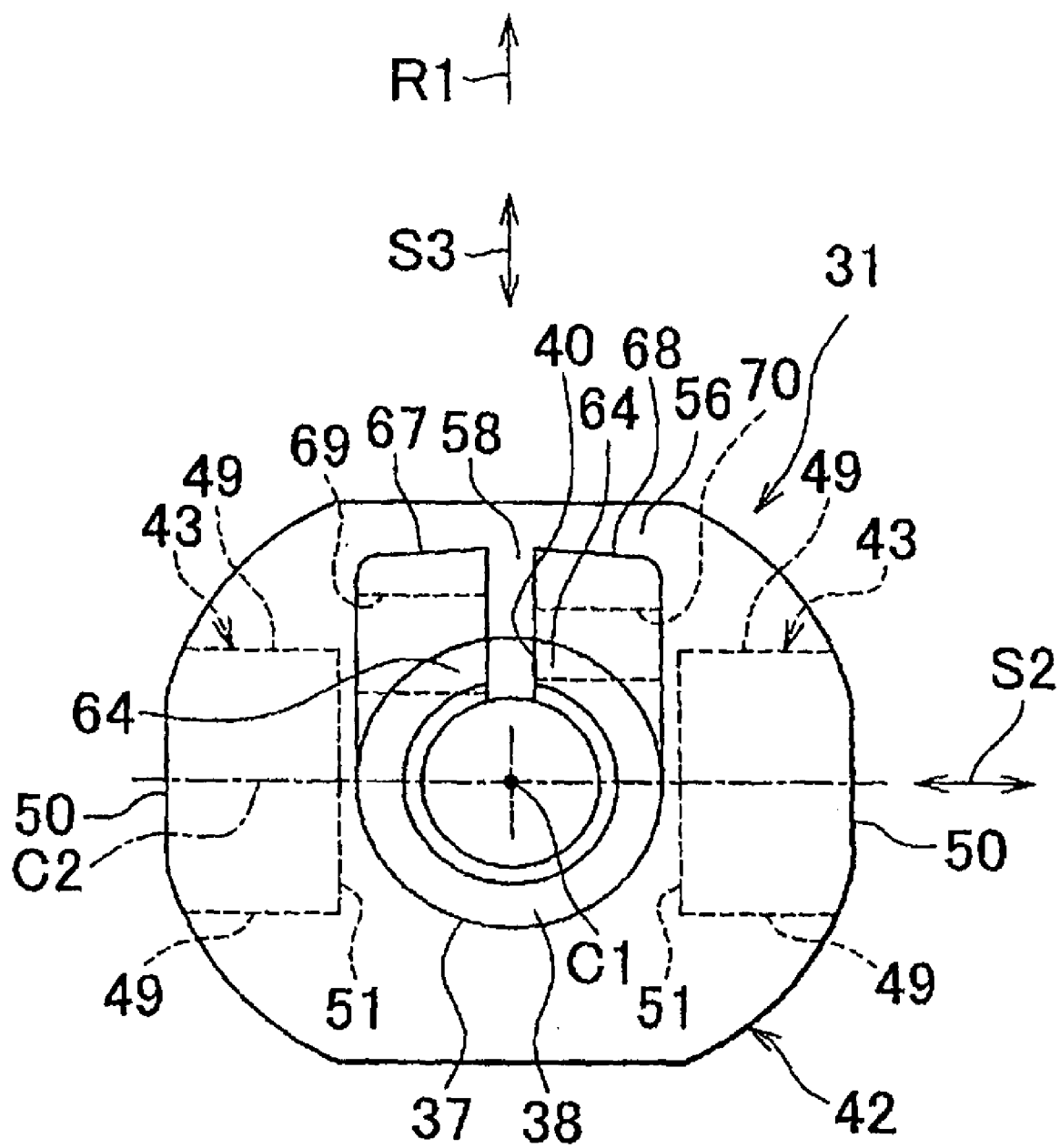
FIG. 6 is a view when viewed in an arrow B direction in FIG. 5.

FIG. 3 is a perspective view of the first yoke 31. FIG. 3 also shows the second yoke 32, the cross shaft 33, the bearings 35, and the like, and the second yoke 32 is schematically shown. FIG. 4 is a side view of the first yoke 31 shown in FIG. 3. FIG. 5 is a plan view of FIG. 4. FIG. 6 is a view when viewed in an arrow B direction in FIG. 5. Referring to FIG. 3, FIG. 4 and FIG. 5, the first yoke 31 has a cylindrical portion 37 for fixing a shaft. The cylindrical portion 37 has one end 38 and the other end 39 in an axial direction S1 (hereinafter, also referred to as first direction S1) of the cylindrical portion 37, which is a first direction. The cylindrical portion 37 has a slit 40 that extends parallel to the first direction S1. In addition, the cylindrical portion 37 is perforated in the first direction S1.

The first yoke 31 has an annular reinforcement flange 42 that extends from the other end 39 of the cylindrical portion 37 radially outward R1 with respect to the cylindrical portion 37. The first yoke 31 has a pair of arms 43. The pair of arms 43 extend from the reinforcement flange 42 on a side opposite to the side on which the cylindrical portion 37 is provided. Each arm 43 has a plate-like shape parallel to the first direction S1. The pair of arms 43 are spaced apart from each other so as to face each other in a second direction S2 perpendicular to the first direction S1. The pair of arms 43 are swingably coupled to the second yoke 32, which serves as another yoke, via the cross shaft 33.

The pair of arms 43, the reinforcement flange 42 and the cylindrical portion 37 are integrally formed of a single material, such as steel. Thus, the first yoke 31 is formed. The first yoke 31 is formed of a plastically processed product made of steel. Referring to FIG. 4 and FIG. 5, the pair of arms 43 are formed to have the same shape. Each arm 43 has a distal end 44 and a proximal end 45.

A support hole 46 is formed in the distal end 44 of each arm 43. The support hole 46 supports the trunnion 34, which is part of the cross shaft 33, via the bearing 35. The distal end 44 has a support hole forming portion 47 in which the support hole 46 is formed. The support hole forming portion 47 has an outer surface 48 that extends parallel to the first direction S1. The outer surface 48 is formed of an annular flat surface perpendicular to the second direction S2. The support hole 46 has a central axis C2. The central axis C2 extends in the second direction S2. The support holes 46 of the pair of arms 43 are arranged coaxially with each other.

Referring to FIG. 4, each arm 43 has a pair of side portions 49 that form part of the surface of the arm 43. The pair of side portions 49 are spaced apart from each other in a third direction S3 perpendicular to both the first direction S1 and the second direction S2. Each side portion 49 has a flat surface that extends parallel to or substantially parallel to the first direction S1. In addition, one of the side portions 49 and the other one of the side portions 49 have flat surfaces facing opposite directions. Referring to FIG. 5, each proximal end 45 has an outer surface 50 and an inner surface 51 that are spaced apart from each other in the second direction S2. The outer surface 50 and the inner surface 51 both extend parallel to the first direction S1. In addition, the outer surface 50 and the inner surface 51 have flat surfaces facing opposite directions.

The thickness L1 of the proximal end 45 of each arm 43 is larger than the thickness L2 of the distal end 44 of the arm 43 (L1>L2). Here, the thicknesses L1 and L2 are measured in the second direction S2. The thickness L2 of the distal end 44 is, for example, the size of the support hole forming portion 47. The thickness L1 of the proximal end 45 is, for example, the distance between the outer surface 50 and the inner surface 51. Referring to FIG. 3 and FIG. 4, the proximal end 45 of each arm 43 has a reinforcement portion 53 that is connected to the reinforcement flange 42 and reinforces the proximal end 45 of each arm 43. The reinforcement portion 53 forms a fillet portion, and has a substantially triangular shape.

The reinforcement flange 42 has an outer peripheral surface 55 as an outer surface 55 of the reinforcement flange 42. When viewed in the second direction S2, the outer peripheral surface 55 of the reinforcement flange 42 and the side portion 49 of each arm 43 are connected to each other via the reinforcement portion 53. Referring to FIG. 4 and FIG. 5, the reinforcement flange 42 has a first end surface 56 and a second end surface 57 that are spaced apart from each other in the first direction S1. Note that the first end surface 56 forms a surface on an opposite side to the second end surface 57. The first end surface 56 adjacent to the cylindrical portion 37 is located in proximity to the outer peripheral surface 61 of the other end 39 of the cylindrical portion 37, and has an annular shape. The first end surface 56 partially includes an inclined surface 58. The inclined surface 58 is inclined with respect to an imaginary plane perpendicular to the first direction S1 at a position of the distal end 39 of the cylindrical portion 37. Note that the inclined surface 58 may also be regarded as being inclined with respect to a plane formed by the second direction and the third direction. The inclined surface 58 is located in proximity to the slit 40.

Specifically, the entire first end surface 56 is inclined with respect to the first direction S1, and has a conical surface. The first end surface 56 is inclined so that a portion of the first end surface 56 is distanced from the arms 43 in the first direction S1 as it goes radially inward with respect to the radial direction of the cylindrical portion 37. The size (thickness) of the reinforcement flange 42 in the first direction S1 is reduced as a portion of the first end surface 56 is distanced from the central axis C1 of the cylindrical portion 37.

Referring to FIG. 4, when viewed from one side in the second direction S2, the outline size L3 of the reinforcement flange 42 in the third direction S3 is larger than the width L4 of the support hole forming portion 47 of each arm 43 (L3>L4). The width L4 of the support hole forming portion 47 is, for example, the width of the support hole forming portion 47 at the center of the support hole 46. The reinforcement flange 42 projects from the side portions 49 of the arms 43 toward both sides in the third direction S3 by a predetermined amount of projection.

Referring to FIG. 5, the outline size L5 of the reinforcement flange 42 in the second direction S2 is equal to the size L6 between the outer surfaces 50 of the proximal ends 45 of the pair of arms 43 (L5=L6). Note that, as will be described later, the outline size L5 of the reinforcement flange 42 is desirably larger than or equal to the size L6 between the outer surfaces 50 of the proximal ends 45 of the pair of arms 43 (L5≧L6). Referring to FIG. 6, when viewed from one side in the first direction S1, the outer shape of the reinforcement flange 42 is a polygonal shape, such as a rectangular shape, with rounded corners. Note that the outer shape of the reinforcement flange 42 may be a circular shape, an elliptical shape, or an oblong shape. When viewed from one side in the first direction S1, the outer shape of the reinforcement flange 42 is formed so that the size of the reinforcement flange 42 is long in the second direction S2.

Referring to FIG. 3 and FIG. 5, the other end 39 of the cylindrical portion 37 has the outer peripheral surface 61. The outer peripheral surface 61 of the other end 39 of the cylindrical portion 37 is connected to the first end surface 56, for example, the inclined surface 58, of the reinforcement flange 42 via a concave curved surface 60. Referring to FIG. 4 and FIG. 5, the cylindrical portion 37 has the slit 40. The slit 40 extends from the one end 38 of the cylindrical portion 37 parallel to the first direction S1 in predetermined length. A slitting end 63 of the slit 40 is located outside the concave curved surface 60 and in proximity to the concave curved surface 60. The slit 40 is formed at a center position P1 within the width of the cylindrical portion 37 in the second direction S2. In addition, the slit 40 is arranged at the center position P1 between the pair of arms 43.

Referring to FIG. 6, the slit 40 is formed at a single portion with respect to the circumferential direction of the cylindrical portion 37. The slit 40 perforates through the cylindrical portion 37 in the radial direction of the cylindrical portion 37. Thus, the one end 38 of the cylindrical portion 37 has such a shape that ends are formed in the circumferential direction. The one end 38 of the cylindrical portion 37 has a pair of edge portions 64 that define the slit 40. Referring to FIG. 2 and FIG. 3, the intermediate shaft 5 is fitted inside the cylindrical portion 37. The intermediate shaft 5 is fixed by a fastening bolt 66.

Referring to FIG. 5 and FIG. 6, the one end 38 of the cylindrical portion 37 has first and second clamping portions 67 and 68 that face each other via the slit 40. The first and second clamping portions 67 and 68 respectively extend from the edge portions 64 radially outward R1 with respect to the cylindrical portion 37. The first clamping portion 67 has an insertion hole 69. The second clamping portion 68 has a screw hole 70. The insertion hole 69 and the screw hole 70 are arranged coaxially with each other, and are arranged at a predetermined distance from the central axis C1 of the cylindrical portion 37.

Referring to FIG. 3, the fastening bolt 66 is inserted through the insertion hole 69, and the external thread of the distal end of the fastening bolt 66 is screw-fitted to the internal thread of the screw hole 70. When the fastening bolt 66 is screwed into the screw hole 70, the head of the fastening bolt 66 presses the first clamping portion 67. By so doing, the diameter of the cylindrical portion 37 is reduced, and, as a result, the intermediate shaft 5 is fixedly fastened by the cylindrical portion 37.

Referring to FIG. 2, the second yoke 32 has a similar structure to that of the first yoke 31 except the following points. Note that like reference numerals denote like components of the second yoke 32 to those of the first yoke 31. The second yoke 32 includes a cylindrical portion 37 and a pair of arms 43, but no reinforcement flange 42 is provided. The pair of arms 43 extend from the other end 39 of the cylindrical portion 37. In addition, a slit 40 of the cylindrical portion 37 of the second yoke 32 is set at a position rotated by 90 degrees from the slit 40 of the first yoke 31 in the circumferential direction of the cylindrical portion 37. That is, the slit 40 of the second yoke 32 is arranged closest to one of the pair of arms 43. In accordance with this, a pair of clamping portions 67 and 68, insertion hole 69 and screw hole 70 of the second yoke 32 are also set at positions rotated by 90 degrees from the pair of clamping portions 67 and 68, insertion hole 69 and screw hole 70 of the first yoke 31.

By so doing, the fastening bolt 66 of the first yoke 31 and the fastening bolt 66 of the second yoke 32 may be fastened in the same direction. Referring to FIG. 3, as described above, the first yoke 31 has the cylindrical portion 37 for fixing a shaft. The slit 40 extends from the one end 38 of the cylindrical portion 37 in the axial direction S1 of the cylindrical portion 37, which is the first direction S1. The annular reinforcement flange 42 extends from the other end 39 of the cylindrical portion 37 radially outward R1 with respect to the cylindrical portion 37. The pair of arms 43 extend from the reinforcement flange 42 on a side which is opposite to the side on which the cylindrical portion 37 is provided. In addition, the pair of arms 43 are swingably coupled to the second yoke 32, which is another yoke, via the cross shaft 33.

In this case, each arm 43 has a plate-like shape so as to extend parallel to the first direction S1. Each arm 43 has the support hole 46 for supporting the trunnion 34, which serves as part of the cross shaft 33, via the bearing 35. The support hole 46 of each arm 43 is located along the central axis C2 that extends in the second direction S2 perpendicular to the first direction S1. The slit 40 is formed at the center position P1 in the width of the cylindrical portion 37 in the second direction S2, and is arranged at the center position P1 between the pair of arms 43. The reinforcement flange 42 has the annular end surface 56 that is in proximity to the outer peripheral surface 61 of the cylindrical portion 37. The end surface 56 includes the inclined surface 58 that is inclined with respect to the third direction S3 perpendicular to both the first direction S1 and the second direction S2 (or the imaginary plane perpendicular to the first direction). The inclined surface 58 is connected to the outer peripheral surface 61 of the cylindrical portion 37 via the concave curved surface 60.

According to the present embodiment, the pair of arms 43 and the cylindrical portion 37 may be reinforced by the annular reinforcement flange 42 against a torsional force in the circumferential direction about the central axis C1 of the cylindrical portion 37. This may extend the life of the first yoke 31. In addition, because of the inclined surface 58 of the end surface 56 of the reinforcement flange 42, a radially outward portion of the reinforcement flange 42 may be relatively distanced from the slit 40 in the first direction S1, while a radially inward portion of the reinforcement flange 42 may be relatively arranged in proximity to the slit 40 in the first direction S1

In this way, a radially inward portion of the reinforcement flange 42 is relatively arranged in proximity to the slit 40, so a portion in proximity to the slit 40 may be effectively reinforced, and the size of the first yoke 31 may be reduced in the first direction S1. Moreover, a radially outward portion of the reinforcement flange 42 is distanced from the slit 40, so it is possible to prevent interference between the reinforcement flange 42 and a disc-shaped tool (not shown) for forming the slit 40 at the time of manufacturing the yoke. Thus, it is possible to prevent a decrease in strength of the reinforcement flange 42 due to the interference. Also, the reinforcement flange 42 is able to reinforce the cylindrical portion 37 and the pair of arms 43, so the life of the universal joint yoke and, by extension, for example, the life of the fastening bolt 66 that fixes the intermediate shaft 5 to the cylindrical portion 37 is able to be extended.

In addition, the slit 40 is formed at the center position P1 in the width of the cylindrical portion 37 in the second direction S2. The slit 40 is arranged at the center position P1 between the pair of arms 43. In this case, the pair of clamping portions 67 and 68 tend to deform in opposite directions in the third direction S3 when a torque is transmitted. As a result, the life of each of the first yoke 31 and the fastening bolt 66 tends to shorten. However, the reinforcement flange 42 is able to reinforce the cylindrical portion 37 and the pair of arms 43, so the life of the first yoke 31 and, by extension, the life of the fastening bolt 66 may be extended.

Referring to FIG. 5, the outline size L5 of the reinforcement flange 42 in the second direction S2 is larger than or equal to the size L6 between the outer surfaces 50 of the proximal ends 45 of the pair of arms 43. By so doing, it is possible to further enhance the reinforcement effect against the above described torsional force. Referring to FIG. 4, when viewed from one side in the second direction S2, the outline size L3 of the reinforcement flange 42 is larger than the width L4 of the support hole forming portion 47 of each arm 43 in the third direction S3. By so doing, it is possible to further enhance the reinforcement effect against the above described torsional force.

In addition, when viewed from one side in the second direction S2, the side portion 49 of each arm 43 is connected to the outer peripheral surface 55 of the reinforcement flange 42 via the substantially triangular reinforcement portion 53. By so doing, it is possible to further enhance the reinforcement effect against the above described torsional force. Referring to FIG. 5, the thickness L1 of the proximal end 45 of each arm 43 is larger than the thickness L2 of the distal end 44 of the arm 43. By so doing, it is possible to further enhance the reinforcement effect against the above described torsional force.

In addition, the cylindrical portion 37, the reinforcement flange 42 and the pair of arms 43 are integrally formed of a single material. By so doing, the size of the first yoke 31 may be further reduced. Referring to FIG. 2, the second universal joint 6 includes the first yoke 31. By so doing, it is possible to obtain the second universal joint 6 with small size and long life. Referring to FIG. 1 and FIG. 2, the electric power steering 1, which serves as the vehicle steering apparatus, includes the steering shaft unit 26 that includes the second universal joint 6. Thus, it is possible to obtain the vehicle steering apparatus with small size and long life. In addition, because deformation of the universal joint yoke 31 is suppressed, stability and controllability improve.

Note that, when the first universal joint includes a yoke having a similar structure to the first yoke 31, a steering shaft unit that includes the first universal joint and the steering shaft 3 may be provided for the vehicle steering apparatus. In addition, when the first universal joint includes a yoke having a similar structure to the first yoke 31, a steering shaft unit that includes the first universal joint and the intermediate shaft 5 may be provided for the vehicle steering apparatus. In addition, a steering shaft unit that includes the second universal joint and the pinion shaft 7 may be provided for the vehicle steering apparatus.

Figure 7:
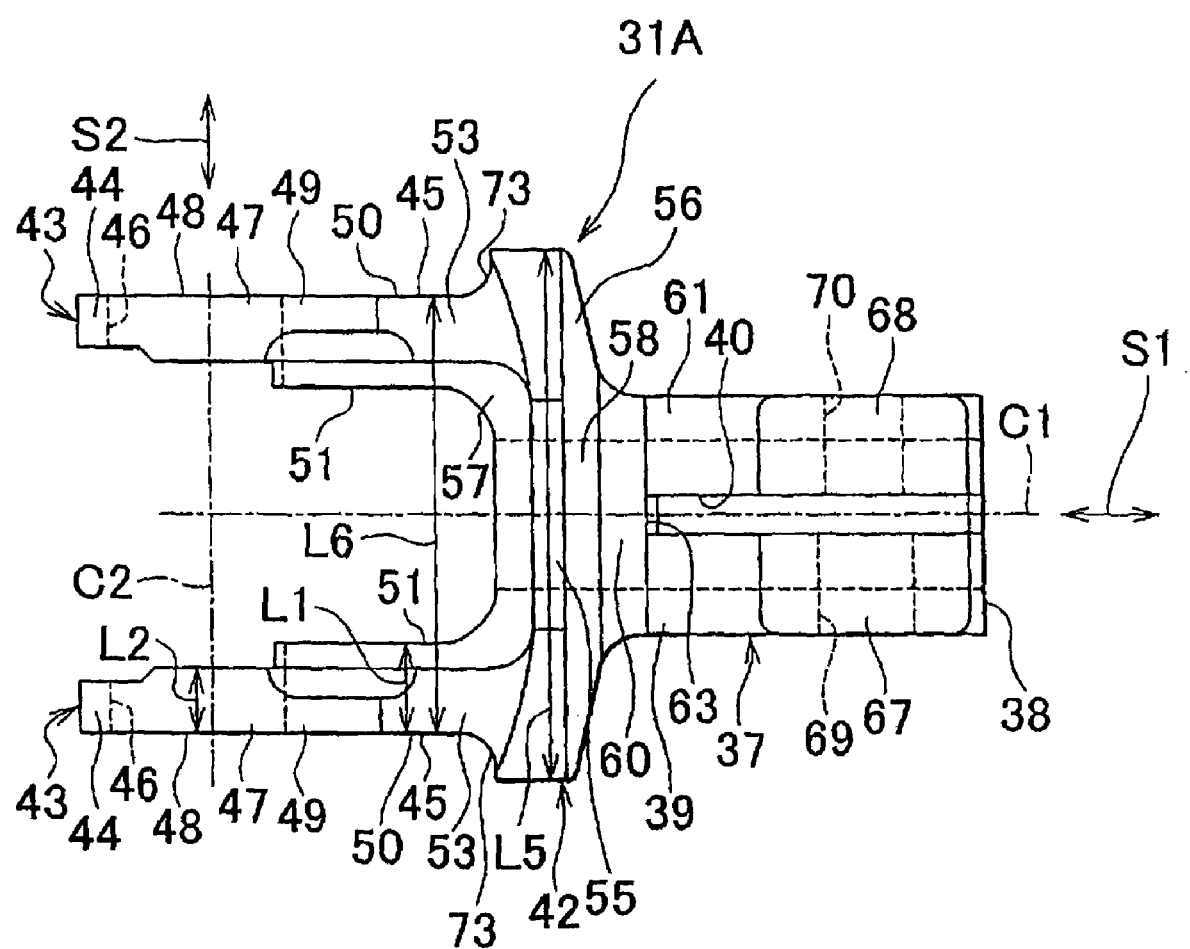
FIG. 7 is a plan view of a universal joint yoke according to an alternative embodiment to the embodiment of the invention.

The present embodiment may be modified into the following alternative embodiment. Hereinafter, only the difference from the above described embodiment will be described. Note that the other configuration is similar to that of the above described embodiment, and like reference numerals denote like components. For example, FIG. 7 is a plan view of a first yoke 31A according to an alternative embodiment to the embodiment of the invention. Referring to FIG. 7, the first yoke 31A is used instead of the first yoke 31. The reinforcement flange 42 of the first yoke 31A projects from the outer surfaces 50 of the proximal ends 45 of the pair of arms 43 toward both sides in the second direction S2. The outline size L5 of the reinforcement flange 42 in the second direction S2 is larger by a predetermined amount than the size L6 between the outer surfaces 60 of the proximal ends 45 of the pair of arms 43. The outer peripheral surface 55 of the reinforcement flange 42 is connected to the outer surface 50 of the proximal end 45 of each arm 43 via a concave curved surface 73.

In addition, in the above described embodiments, the inner periphery of the other end 39 of the cylindrical portion 37 is open; instead, it may be closed. The invention is not limited to the above embodiments.

What is claimed is:

1. A universal joint yoke comprising:
    a cylindrical portion for fixing a shaft;
    a slit that is formed in the cylindrical portion and that extends radially through the thickness of the cylindrical portion from one end of the cylindrical portion in an axial direction of the cylindrical portion, which is a first direction;
    a reinforcement flange that extends from the other end of the cylindrical portion radially outward with respect to the cylindrical portion; and
    a pair of arms that extend from the reinforcement flange on a side opposite to a side on which the cylindrical portion is provided, and that are swingably coupled to another yoke via a coupling shaft, wherein a width of the reinforcement flange, in a radial direction perpendicular to the axial direction, is at least as great as a maximum width of the pair of arms.

2. The universal joint yoke according to claim 1, wherein the reinforcement flange has an annular shape.

3. The universal joint yoke according to claim 1, wherein the coupling shaft is an X-shaped coupling shaft.

4. The universal joint yoke according to claim 1, wherein the thickness of a proximal end of each of the arms is larger than the thickness of a distal end of the arm.

5. The universal joint yoke according to claim 1, wherein the cylindrical portion, the reinforcement flange and the pair of arms are integrally formed of a single material.

6. A universal joint yoke comprising:
a cylindrical portion for fixing a shaft;
a slit that is formed in the cylindrical portion and that extends radially through the thickness of the cylindrical portion from one end of the cylindrical portion in an axial direction of the cylindrical portion, which is a first direction;
a reinforcement flange that extends from the other end of the cylindrical portion radially outward with respect to the cylindrical portion; and
a pair of arms that extend from the reinforcement flange on a side opposite to a side on which the cylindrical portion is provided, and that are swingably coupled to another yoke via a coupling shaft, wherein
the reinforcement flange has an inclined surface that is located in proximity to an outer peripheral surface of the cylindrical portion, and
the inclined surface is formed so that a portion of the inclined surface is distanced from a plane as the portion of the inclined surface goes radially outward from the cylindrical portion, wherein the plane is perpendicular to the first direction, and intersects with the cylindrical portion.

7. The universal joint yoke according to claim 6, wherein the inclined surface of the reinforcement flange is connected to the cylindrical portion via a concave curved surface.

8. The universal joint yoke according to claim 6, wherein each of the arms has a plate-like shape so as to extend parallel to the first direction,
each of the arms has a support hole for supporting a trunnion, which forms part of the coupling shaft, via a bearing, and
the support hole has a central axis that extends in a second direction perpendicular to the first direction.

9. The universal joint yoke according to claim 8, wherein the slit is arranged at a center position in the width of the cylindrical portion in the second direction.

10. The universal joint yoke according to claim 9, wherein the slit is formed in the cylindrical portion between the pair of arms.

11. The universal joint yoke according to claim 8, wherein the outline size of the reinforcement flange in the second direction is larger than or equal to the size in the second direction between outer surfaces of proximal ends of the pair of arms.

12. The universal joint yoke according to claim 8, wherein a direction perpendicular to both the first direction and the second direction is defined as a third direction, and
when viewed in the second direction, the outline size of the reinforcement flange in the third direction is larger than the width of a support hole forming portion of each arm in the third direction.

13. The universal joint yoke according to claim 8, wherein when viewed in the second direction, a side portion of each of the arms is connected to an outer surface of the reinforcement flange via a substantially triangular reinforcement portion.

14. A universal joint comprising:
a first yoke;
a second yoke; and
a coupling shaft that couples the first yoke to the second yoke,
wherein at least one of the first yoke and the second yoke includes a cylindrical portion for fixing a shaft;
a slit that is formed in the cylindrical portion and that extends from one end of the cylindrical portion in an axial direction of the cylindrical portion, which is a first direction;
a reinforcement flange that extends from the other end of the cylindrical portion radially outward with respect to the cylindrical portion in circumferential alignment with the slit; and
a pair of arms that extend from the reinforcement flange on a side opposite to a side on which the cylindrical portion is provided, and that are swingably coupled to another yoke via a coupling shaft, wherein
each of the first yoke and the second yoke includes:
a fastening bolt;
a pair of clamping portions that are provided for the cylindrical portion and that are provided via the slit; and
a screw hole that is formed in the clamping portions for screwing the fastening bolt,
wherein the slit, the clamping portions and the screw hole formed in the second yoke are arranged at a position that is offset 90 degrees from the slit, the clamping portions and the screw hole formed in the first yoke.

15. A vehicle steering apparatus comprising:
a steering member;
a first shaft that is coupled to the steering member;
a universal joint; and
a second shaft that is coupled to the first shaft via the universal joint, wherein
a universal joint yoke used for the universal joint includes
a cylindrical portion for fixing a shaft;
a slit that is formed in the cylindrical portion and that extends radially through the thickness of the cylindrical portion from one end of the cylindrical portion in an axial direction of the cylindrical portion, which is a first direction;
a reinforcement flange that extends from the other end of the cylindrical portion radially outward with respect to the cylindrical portion; and
a pair of arms that extend from the reinforcement flange on a side opposite to a side on which the cylindrical portion is provided, and that are swingably coupled to another yoke via a coupling shaft,
wherein a width of the reinforcement flange, in a radial direction perpendicular to the axial direction, is at least as great as a maximum width of the pair of arms.

* * * * *